United States Patent [19]

Hikmet

[11] Patent Number: 5,762,823
[45] Date of Patent: Jun. 9, 1998

[54] SWITCHABLE CHOLESTERIC FILTER AND LUMINAIRE HAVING SUCH A FILTER

[75] Inventor: Rifat A. M. Hikmet, Eindhoven, Netherlands

[73] Assignee: U.S. Philips Corporation, New York, N.Y.

[21] Appl. No.: 668,428

[22] Filed: Jun. 14, 1996

Related U.S. Application Data

[63] Continuation of Ser. No. 302,135, Sep. 7, 1994, abandoned.

[30] Foreign Application Priority Data

Sep. 8, 1993 [BE] Belgium ............... 09300943

[51] Int. Cl.⁶ .................. C09K 19/52; G02F 1/13
[52] U.S. Cl. .................. 252/299.01; 349/13
[58] Field of Search ............ 252/299.01; 349/13

[56] References Cited

U.S. PATENT DOCUMENTS

| | | | |
|---|---|---|---|
| 5,188,760 | 2/1993 | Hikmet et al. | 252/299.01 |
| 5,221,978 | 6/1993 | Heynderickx et al. | 359/53 |
| 5,251,048 | 10/1993 | Doane et al. | 359/51 |
| 5,257,127 | 10/1993 | Hikmet | 359/332 |
| 5,282,121 | 1/1994 | Bornhorst et al. | 362/294 |
| 5,304,323 | 4/1994 | Arai et al. | 252/299.5 |
| 5,323,251 | 6/1994 | Coates et al. | 359/51 |
| 5,342,545 | 8/1994 | Yamada et al. | 252/299.01 |
| 5,354,498 | 10/1994 | Akashi et al. | 252/299.01 |
| 5,356,557 | 10/1994 | Jubb et al. | 252/299.01 |
| 5,374,371 | 12/1994 | Takeuchi et al. | 252/299.01 |

FOREIGN PATENT DOCUMENTS

| | | |
|---|---|---|
| 0423881 | 4/1991 | European Pat. Off. . |
| 0445628 | 9/1991 | European Pat. Off. . |
| 0451905 | 10/1991 | European Pat. Off. . |
| 0501563 | 9/1992 | European Pat. Off. . |
| 0562431 | 9/1993 | European Pat. Off. . |
| 0586014 | 3/1994 | European Pat. Off. . |
| 63-128317 | 5/1988 | Japan . |

Primary Examiner—C. H. Kelly
Attorney, Agent, or Firm—Walter M. Egbert, III

[57] ABSTRACT

The invention relates to a switchable cholesteric filter. Said filter comprises an optically active layer which is situated between two substrates which are both provided with an electrode for applying an electric field. The optically active layer comprises a liquid-crystalline material which is in the cholesteric phase. In accordance with the invention, the optically active layer comprises a three-dimensional polymer network which consists of the polymerization product of maximally 2 wt. % of monomers with at least two polymerizable groups and maximally 30 wt. % of liquid-crystalline monomers with one polymerizable group, and the rest of the optically active layer consists predominantly of a mixture of chiral and achiral liquid-crystalline molecules. An optically active layer of this composition can be switched in a simple and reproducible manner by means of an electric field. The invention also relates to a luminaire comprising such a switchable cholesteric filter.

7 Claims, 8 Drawing Sheets

SWITCHABLE CHOLESTERIC FILTER AND LUMINAIRE HAVING SUCH A FILTER

This is a continuation of application Ser. No. 08/302,135, filed Sep. 7, 1994, now abandoned.

BACKGROUND OF THE INVENTION

The invention relates to a switchable cholesteric filter comprising an optically active layer which is situated between two substrates which are both provided with an electrode for applying an electric field, with the optically active layer containing a liquid crystalline material which is in the cholesteric phase. The invention also relates to a luminaire having such a switchable cholesteric filter. Switchable cholesteric filters can also be used in circular polarizers and reflectors as well as in so-called "notch filters" and "bandpass filters".

A switchable cholesteric filter of the type mentioned in the opening paragraph is known per se. For example, in Japanese Patent Application JP 63-128317 a description is given of a cholesteric filter whose colour can be switched over a wide wavelength range by means of an electric field. The optically active layer of the known cholesteric filter consists of a thermotropic copolymer having substituted glutamate residues as the side groups. At a temperature below the liquid crystalline transition temperature, the polymer material is in the cholesteric phase. It is noted that "the switching of a cholesteric filter" is to be understood to mean herein that the reflection characteristic of the filter, for example the wavelength or the intensity of the reflection band, is changed under the influence of an electric field.

The known cholesteric filter has disadvantages. For example, the changing of the colour is a complicated and time-consuming activity. To change the colour, the temperature of the optically active layer is raised above the liquid crystalline transition temperature, whereafter an electric field is applied in the isotropic phase or the intensity of the field present is changed, after which the layer is cooled to the desired temperature. Besides, in the case of the known filter, the switching rate and the reproducibility of the switching process are insufficient. For example, at a certain field intensity, the reflection band changes with time. It has been found that a considerable degree of hysteresis occurs during switching. In addition, the temperature sensitivity of the filter is relatively high.

SUMMARY OF THE INVENTION

It is an object of the invention to overcome the above-mentioned disadvantages. The invention more particularly aims at providing a cholesteric filter having a high switching rate and exhibiting a stable switching behaviour without hysteresis when used over a prolonged period of time. In addition, the reflection characteristic of the filter should exhibit a relatively small temperature dependence. Besides, the filter in accordance with the invention should be switchable at the operating temperature and under the influence of relatively small electric field intensities.

These and other objects are achieved by a switchable cholesteric filter of the type mentioned in the opening paragraph, which is characterized according to the invention in that the optically active layer comprises a three-dimensional polymer network which consists of the polymerization product of maximally 2 wt. % of monomers comprising at least two polymerizable groups and maximally 30 wt. % of liquid crystalline monomers comprising one polymerizable group, the rest of the optically active layer consisting predominantly of a mixture of chiral and/or achiral liquid crystalline molecules.

At the operating temperature, the cholesteric filter in accordance with the invention exhibits a very rapid switching behaviour on applying an electric field or changing the intensity of an electric field. Minor changes in the electric field intensity cause the average wavelength of the reflection band of the filter to change. If higher electric field intensities are applied, the intensity of the band decreases. It has been found that, at still higher field intensities, the band can be made to disappear, causing the cholesteric filter to be completely transparent under these conditions.

It has further been found that the switching behaviour of the cholesteric filter in accordance with the invention is remarkably reproducible when it is used over a prolonged period of time. In experiments it has been established that after approximately 1000 switching operations the wavelength of the reflection band is unchanged after the voltage has been removed. The reflection characteristic of the filter, which is measured before and after the switching test, proved to be substantially identical. It has also been found that in the switching process substantially no hysteresis occurs. The characteristic is not influenced by the preceding switching trajectory. In the switching process the maximally required switching voltages are of the order of 100 V/cm or less.

Due to the presence of relatively few monomers with two or more polymerizable groups relative to monomers with one polymerizable group, a very slightly cross-linked polymer network is formed during the polymerization of the optically active layer. The quantity of monomers with two or more polymerizable groups should maximally amount to 2 wt. % relative to the overall quantity of material in the optically active layer. If a larger quantity of this type of monomers is used the elastic constant of the polymerized layer becomes too high. This results in a relatively slow and incomplete response of the liquid crystalline material to an applied or changed electric field. This adversely affects the switching behaviour of the cholesteric filter in accordance with the invention. In that case, relatively high switching voltages are required. In addition, it has been found that under these conditions hysteresis occurs in the switching process. It has further been found that the desired properties of the cholesteric filter are optimal if, in the manufacture of the optically active layer, a quantity of approximately 0.1–1 wt. % of monomers with two or more polymerizable groups is used.

The molecules of the network which originate from monomers with at least two polymerizable groups preferably comprise a liquid-crystalline group. After polymerization, this type of molecules is incorporated in the network via two chemical bonds at the cross-linking points of the polymer chains. By virtue of the use of this type of monomers it is achieved that the reflection band of the cholesteric filter in accordance with the invention is less temperature-sensitive. This allows the filter to be used in a relatively wider temperature range.

The quantity of monomers with one polymerizable group may maximally be 30 wt. % of the overall quantity of material in the optically active layer. If a larger quantity of this type of monomer is used, the viscosity of the polymerized optically active layer becomes unacceptably high. This adversely affects the switching behaviour of the optical layer. Switching of the filter at the operating temperature becomes practically impossible under these conditions. It has been found that the desired properties of the cholesteric filter are optimal if in the manufacture of the optically active layer a quantity of 15–25 wt. % of monomers with one polymerizable group is used. The monomers with one polymerizable group may be chiral or achiral.

For the polymerizable groups of the monomers use can be made of epoxy compounds, vinylether compounds and/or thiolene systems. In accordance with a favourable embodiment of the invention, (meth)acrylate groups are used as the polymerizable groups of the monomers. It has been found that this type of polymerizable groups enables optically active layers of high quality to be obtained.

The rest of the optically active layer consists predominantly of a mixture of liquid-crystalline molecules. Dependent on the desired reflection characteristic of the filter, a greater or smaller part of these molecules is chiral and the rest is achiral. These liquid-crystalline molecules do not contain polymerizable groups and hence are considered to be "chemically inert" or "free". These chemically inert molecules form as it were a mobile phase between a stationary phase formed by the chains of the polymer network. The liquid-crystalline group(s) of the free molecules interact (s), for example "stacking", with the liquid-crystalline groups incorporated in the network. The ratio between the chiral and achiral molecules, as well as the exact chemical structure of these compounds determine to an important degree the reflection characteristic of the cholesteric filter.

In the optically active layer of the cholesteric filter in accordance with the invention, two different types of liquid-crystalline groups can be distinguished. In the first place the filter contains liquid-crystalline groups in the form of side groups which are attached to the chains of the network via a single chemical bond. This first type of liquid-crystalline groups originates from the liquid-crystalline monomers which comprise one polymerizable group. The filter further comprises liquid-crystalline groups which are not attached to the network via a chemical bond. This second type of liquid-crystalline groups originates from the liquid-crystalline compounds which are chemically inert. Since the liquid-crystalline groups of the first type are attached to the chains of the network via a chemical bond, their mobility in the optically active layer is less than that of the second type of liquid-crystalline groups. Under these conditions, the groups of the first type can act as a kind of switch between, on the one hand, the liquid-crystalline molecules which are freely incorporated in the network and, on the other hand, the relatively rigid network.

For the manufacture of the optically active layer a mixture consisting of maximally 2 wt. % of monomers with at least two polymerizable groups, maximally 30 wt. % of liquid-crystalline monomers with one polymerizable group and a residual mixture of chiral and/or achiral liquid-crystalline molecules is polymerized in the presence of a polymerization initiator. Polymerization preferably takes place under the influence of exposure to actinic radiation. This is to be understood to mean herein irradiation with light, preferably UV, X-rays, gamma rays or irradiation with high-energy particles. However, it is alternatively possible to thermally polymerize the layer in the absence of a photoinitiator.

Prior to polymerization, the mixture is provided between two flat, transparent substrates, for example of glass, which are provided with an optically transparent electrode, preferably of indium tin oxide (ITO), on the facing surfaces. In a favourable embodiment, the substrates are also provided with orientation layers, for example of rubbed polymers, such as polyimide, or of sputtered $SiO_x$. In the case of photopolymerization, irradiation can be carried out via the transparent substrates. The thickness of the active layer is 0.5 to 20 micrometers, preferably 1–10 micrometers.

The invention also relates to a luminaire comprising a connection for a light source and a cholesteric filter. In accordance with the invention, a switchable cholesteric filter as described hereinabove is used. This type of luminaire in accordance with the invention enables the colour temperature of the emitted light to be influenced in a simple and reproducible manner.

BRIEF DESCRIPTION OF THE DRAWINGS

The invention will be explained in greater detail by means of exemplary embodiments and with reference to the accompanying drawing, in which.

DETAILED DESCRIPTION OF THE PREFERRED EMBODIMENT

Figure 1:
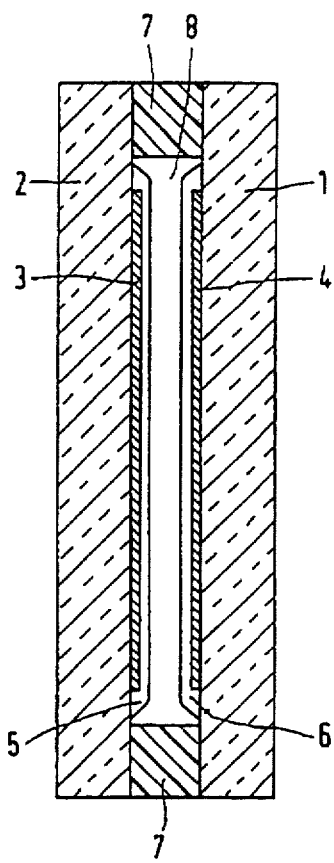
FIG. 1 is a switchable cholesteric filter (not drawn to scale) in accordance with the invention.

FIG. 1 shows a switchable cholesteric filter in accordance with the invention. In the present embodiment, this filter comprises two flat, transparent substrates 1 and 2, for example of glass, which extend parallel to each other and are arranged at some distance from each other. The correct distance between the substrates is maintained by spacers (not shown). The spacers consist of balls or fibres of uniform diameter which are present between the substrates. Each substrate is provided with a transparent electric electrode 3 and 4, for example of ITO, on the side facing the other substrate. Preferably, the substrates are also provided with an orientation layer 5 and 6, for example of rubbed polyamide or obliquely sputtered $SiO_x$. The edges of the substrates are provided with a packing strip 7.

The substrates and the packing strip enclose a space which accommodates an optically active layer 8 containing liquid-crystalline material which is in the cholesteric phase. This layer contains a three-dimensional polymer network which consists of the polymerization product of maximally 2 wt. % of monomers with at least two polymerizable groups and maximally 30 wt. % of liquid-crystalline monomers with one polymerizable group, the rest of the optically active layer consisting predominantly of a mixture of chiral and achiral liquid-crystalline molecules.

Figure 2:
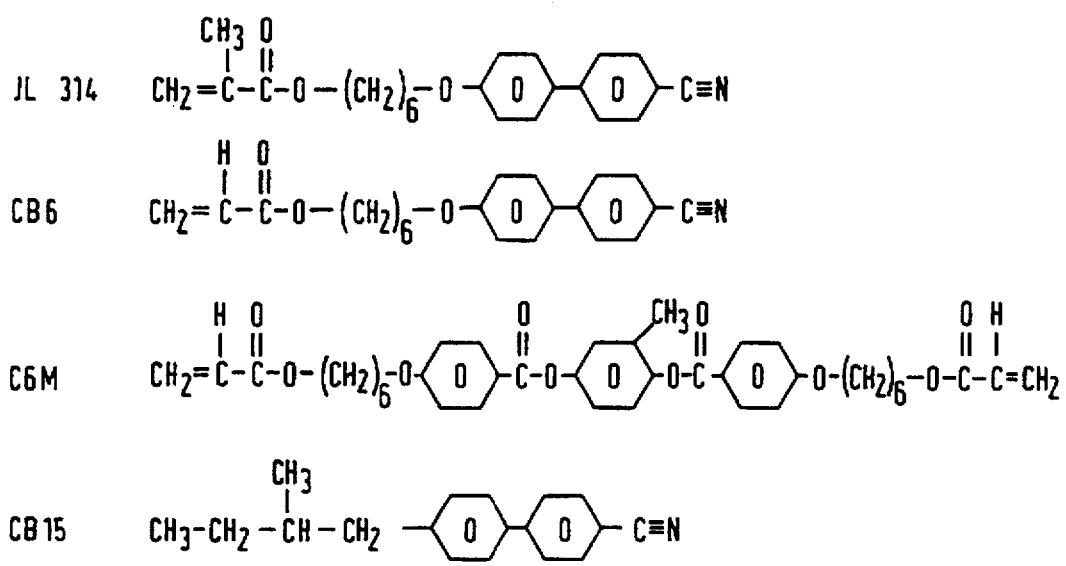
FIG. 2 represents structural formulas of a number of monomers used in the manufacture of the inventive filter.

In the present case, a mixture consisting of 1.0 wt. % of the diacrylate C6M, 19.0 wt. % of the monoacrylate JL314, 39.5 wt. % of the non-reactive chiral CB15 and 40.5 wt. % of the non-reactive achiral Bl006 was used for a first embodiment of the inventive filter. The chemical structural formulas which correspond to the designations of a number of these compounds are described in FIG. 2. Bl006 is produced by Merck. It contains fluorine-substituted and/or chlorine-substituted cyanobivinyl and cyanotervinyl compounds. A quantity of 1 wt. % of the photoinitiator Igacure 651 was added to this mixture. After the mixture had been provided between the substrates (interspace 2.7 micrometers) the mixture was polymerized by means of an UV source (wavelength 366 nm).

Figure 3:
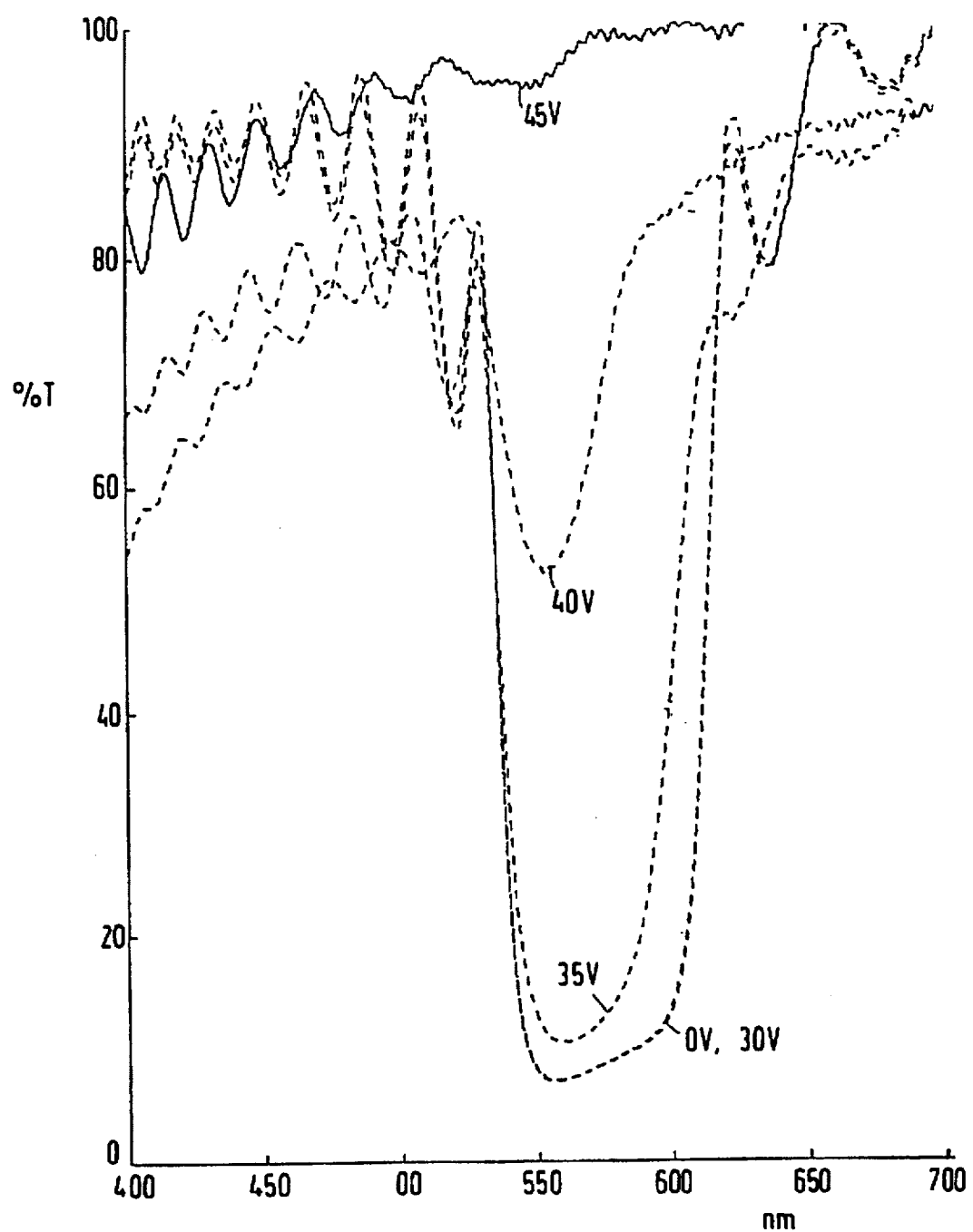
FIG. 3 shows a number of spectra in which the transmission of a first embodiment of an inventive filter is shown as a function of the applied field intensity.

FIG. 3 shows a transmission spectrum of the first embodiment of the inventive filter, in the absence of an electric field (0 V) and in the presence of an electric field of 30, 35, 40 and 45 V. The transmission peak at the wavelength of approximately 550 nm remains substantially unchanged up to a field intensity of approximately 30 V. At higher field intensities, the intensity of the peak decreases rapidly. At a field intensity of 45 V the peak has substantially disappeared. When the electric field is removed or reduced to below 30 V, the original transmission peak at 550 nm is immediately restored. Switching between both extreme states, i.e. between 30 V and 45 V, can be repeated many times without the occurrence of an important change in the spectra. Hysteresis did not occur either. All measurements on and changes in the electric field are carried out at room temperature.

Figure 4:
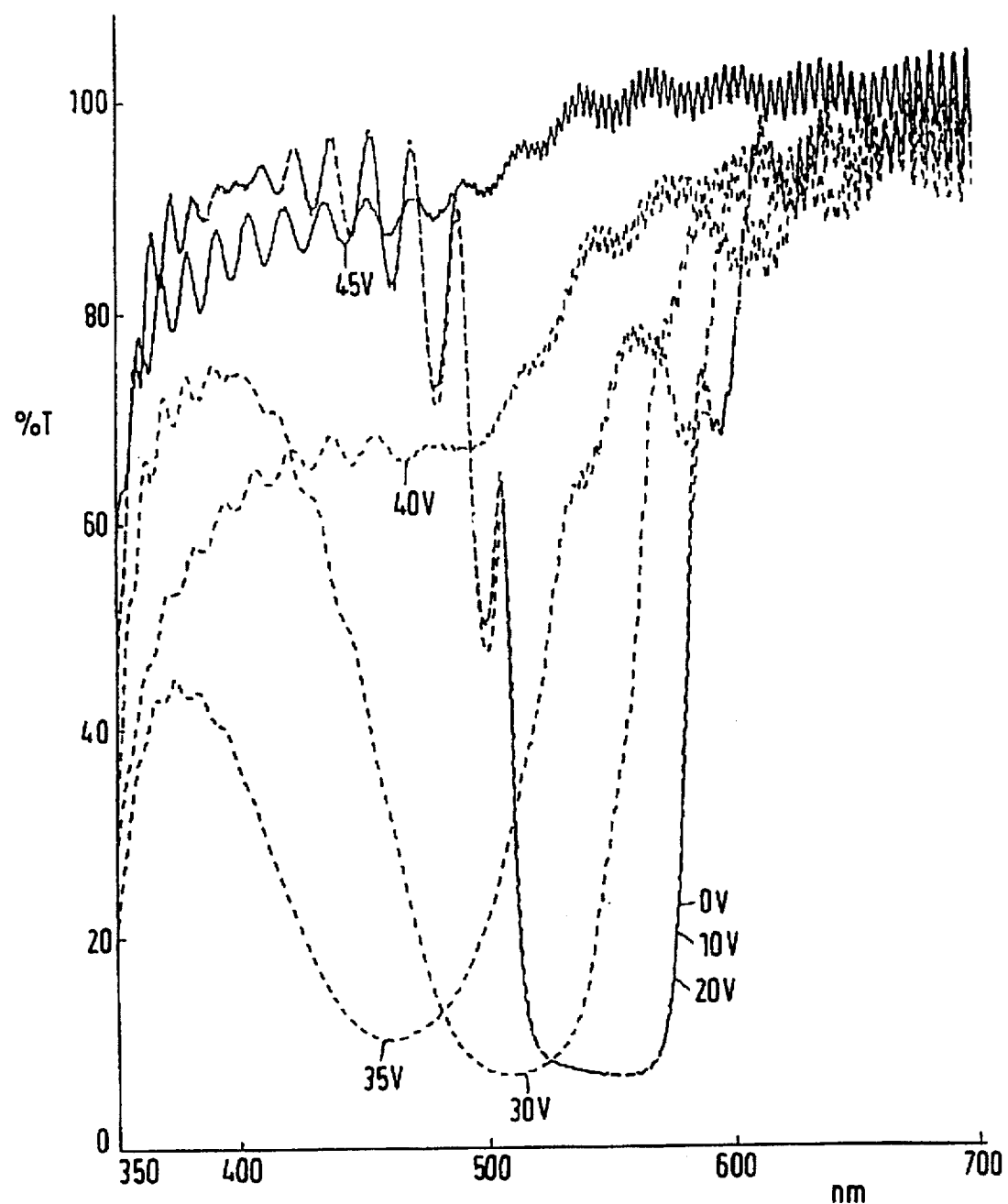
FIG. 4 shows a number of spectra in which the transmission of a second embodiment of the inventive filter is shown as a function of the applied field intensity.

FIG. 4 shows a transmission spectrum of a second embodiment of a switchable cholesteric filter in accordance with the invention. Said filter was manufactured from a polymerizable mixture of 0.8 wt. % C6M, 19.3 wt. % CB6, 39.4 wt. % CB15 and 39.5 wt. % BL006, to which 1 wt. % of Igacure 651 was added. In this embodiment, the transmission spectrum remains unchanged up to field intensities of approximately 20 V. At higher values the transmission peak shifts and the intensity of the peak decreases. At approximately 45 V the peak has disappeared substantially completely. Also in this case the switchability of this cholesteric filter proved to be very reproducible.

A third embodiment of the switchable cholesteric filter in accordance with the invention was manufactured as follows. A mixture consisting of 0.7 wt. % of the diacrylate C6M, 20 wt. % of the chiral monoacrylate 267, 4 wt. % of the non-reactive, chiral CB15 and 75.3 wt. % of the non-reactive, achiral 18840 (produced by Merck) was polymerized, in the presence of 1 wt. % of Igacure 651, between two transparent substrates, as described hereinbefore. It is noted that the monoacrylate 267 is substantially identical to CB6. Unlike CB6, monoacrylate 267 comprises an asymmetric C-atom in the aliphatic chain, which causes the compound to become chiral.

In a fourth embodiment of the switchable cholesteric filter in accordance with the invention, the quantity of achiral and chiral non-reactive compounds in the optically active layer of the third embodiment was changed. In this case, 14 wt. % of the non-reactive, chiral CB 15 and 46.3 wt. % of the non-reactive, achiral 18840 were used. The other components in the optically active layer of the fourth embodiment were identical in structure and quantity to the components of the third embodiment. The three-dimensional polymer network was formed by photopolymerization, as described hereinabove.

Figure 5:
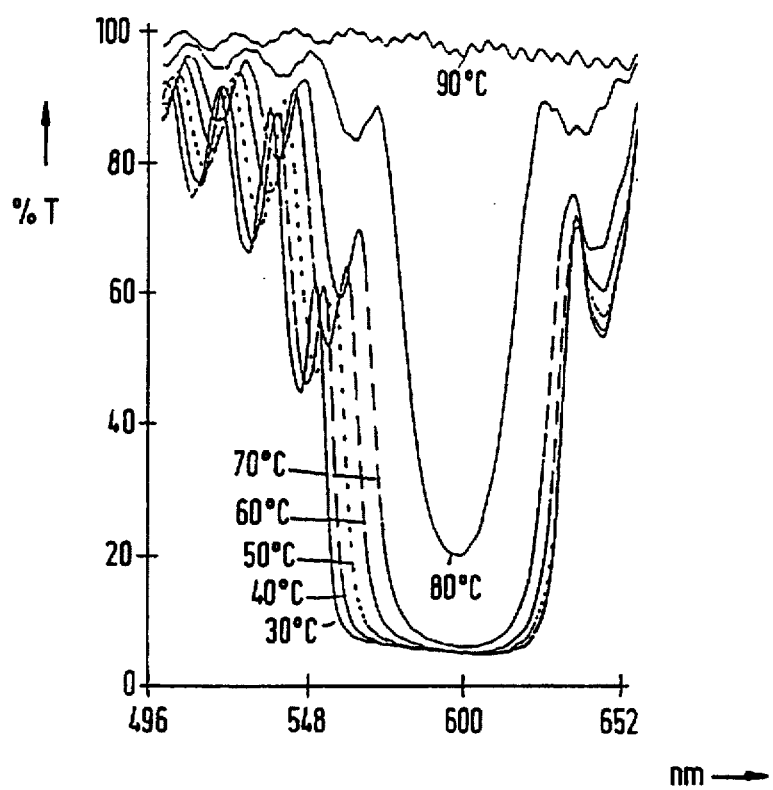
FIG. 5 shows a number of transmission spectra of a third embodiment of the inventive filter at different temperatures.
Figure 6:
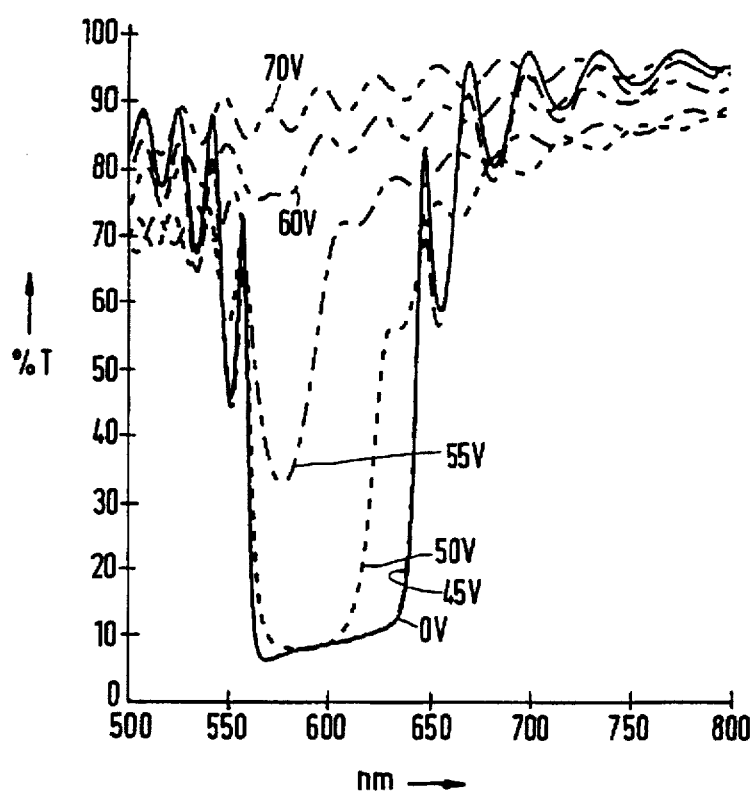
FIG. 6 shows a number of transmission spectra of the third embodiment of the inventive filter at different intensities of the electric fields.
Figure 7:
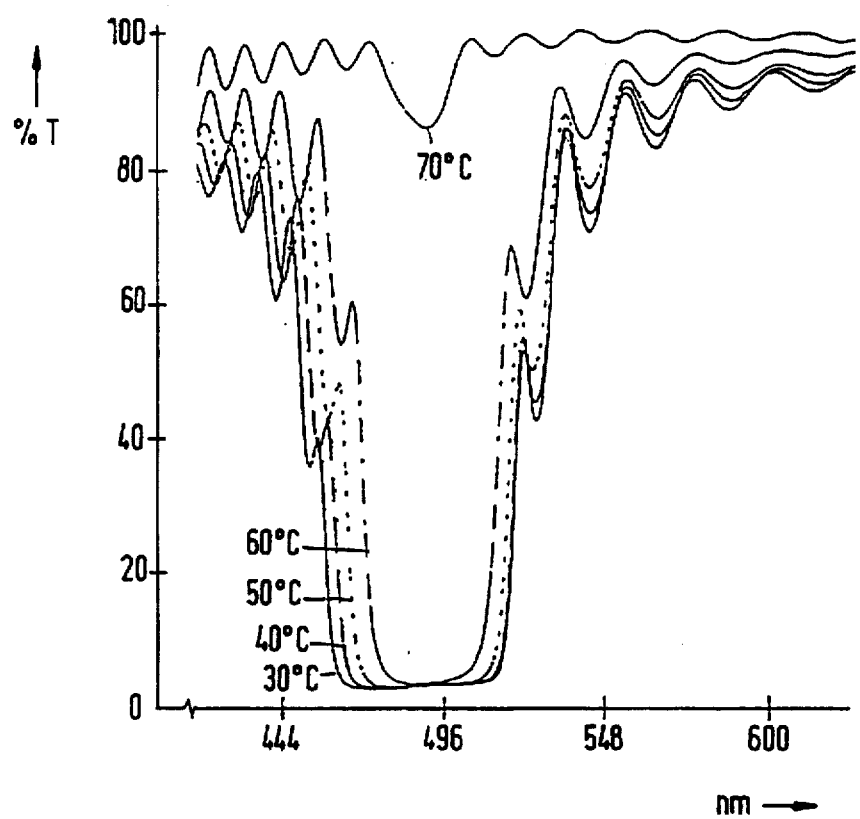
FIG. 7 shows a number of transmission spectra of a fourth embodiment of the inventive filter at different temperatures.
Figure 8:
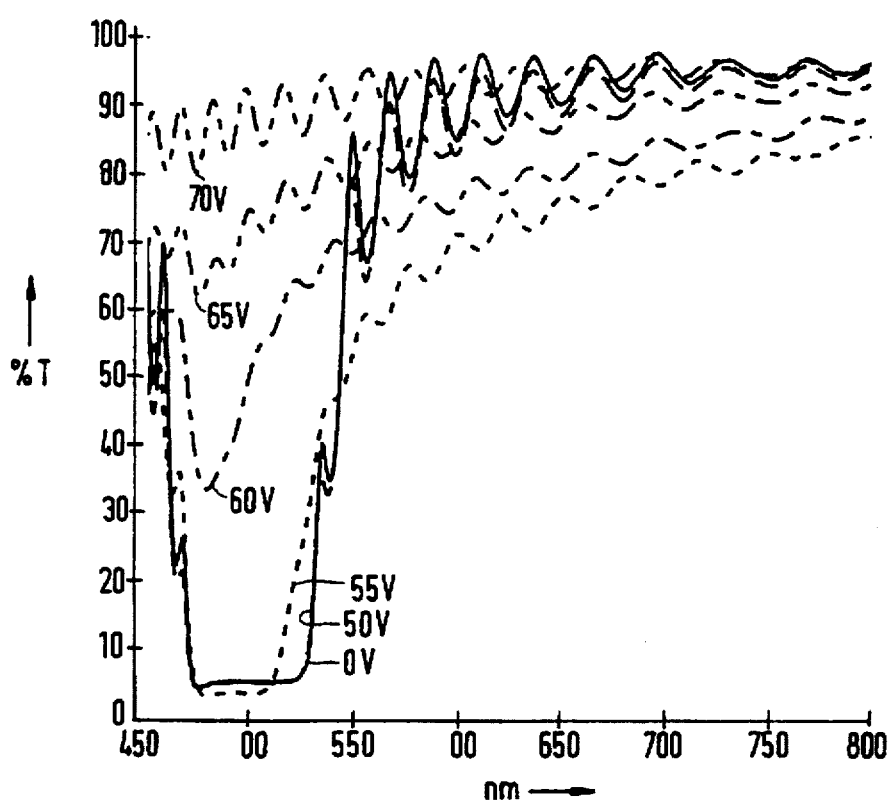
FIG. 8 shows a number of transmission spectra of the fourth embodiment of the inventive filter at different intensities of the electric fields.

FIGS. 5 and 6 show, respectively, the temperature-dependence and the voltage-dependence of the inventive cholesteric filter in accordance with the third embodiment. FIGS. 7 and 8 show, respectively, the temperature-dependence and the voltage-dependence of the fourth embodiment of the inventive cholesteric filter. A comparison of FIG. 5 with FIG. 7 and of FIG. 6 with FIG. 8 reveals that the transmission band of the fourth embodiment is situated at a lower wavelength than the corresponding band of the third embodiment. This can be attributed to the fact that the filter in accordance with the fourth embodiment contains relatively more non-reactive, chiral material. Due to this, the pitch of the molecular helix in the optically active layer of the fourth embodiment is smaller. This leads to a transmission band at a smaller wavelength.

FIGS. 5 and 7 show that the inventive filters have a satisfactory temperature-stability. In both cases, the transmission band remains intact upto approximately 70° C. The band disappears at higher temperatures. However, when the temperature decreases again, the above-mentioned transmission band is instantly restored.

FIGS. 6 and 8 further show that the inventive filters also exhibit a satisfactory voltage characteristic. For example, in both cases the intensity of the transmission band remains unchanged upto approximately 50 V. At higher values the intensity decreases rapidly. However, when the electric field is removed, the original transmission spectrum is instantly restored.

In addition, the colour temperature of the inventive filters in accordance with the third and fourth embodiments was determined as a function of an applied electric field. First of all, measurements in which use was made of unpolarized light were carried out. It was found that in the third exemplary embodiment the colour temperature decreases from 4000 K at a field intensity of 0 V to 3000 K at a field intensity of 60 V. The transition point is approximately at 50 V. In the fourth exemplary embodiment, the colour temperature increases from approximately 2600 K at a field intensity of 0 V to approximately 3000 K at a field intensity of approximately 65 V. In this case, the transition point was approximately at 60 V.

Colour temperature measurements in which use was made of circularly polarized light were also carried out. In this case, the colour temperature of the filter in accordance with the third exemplary embodiment decreased from approximately 7800 K at a field intensity of 0 V to approximately 3000 K at a field intensity of 60 V. The transition point was approximately at 60 V.

Consequently, the switchable cholesteric filters in accordance with the invention can very suitably be used to change the colour temperature of lamps under the influence of an electric field. Said filters can be used with lamps emitting polarized light as well as with lamps emitting unpolarized light.

Figure 9:
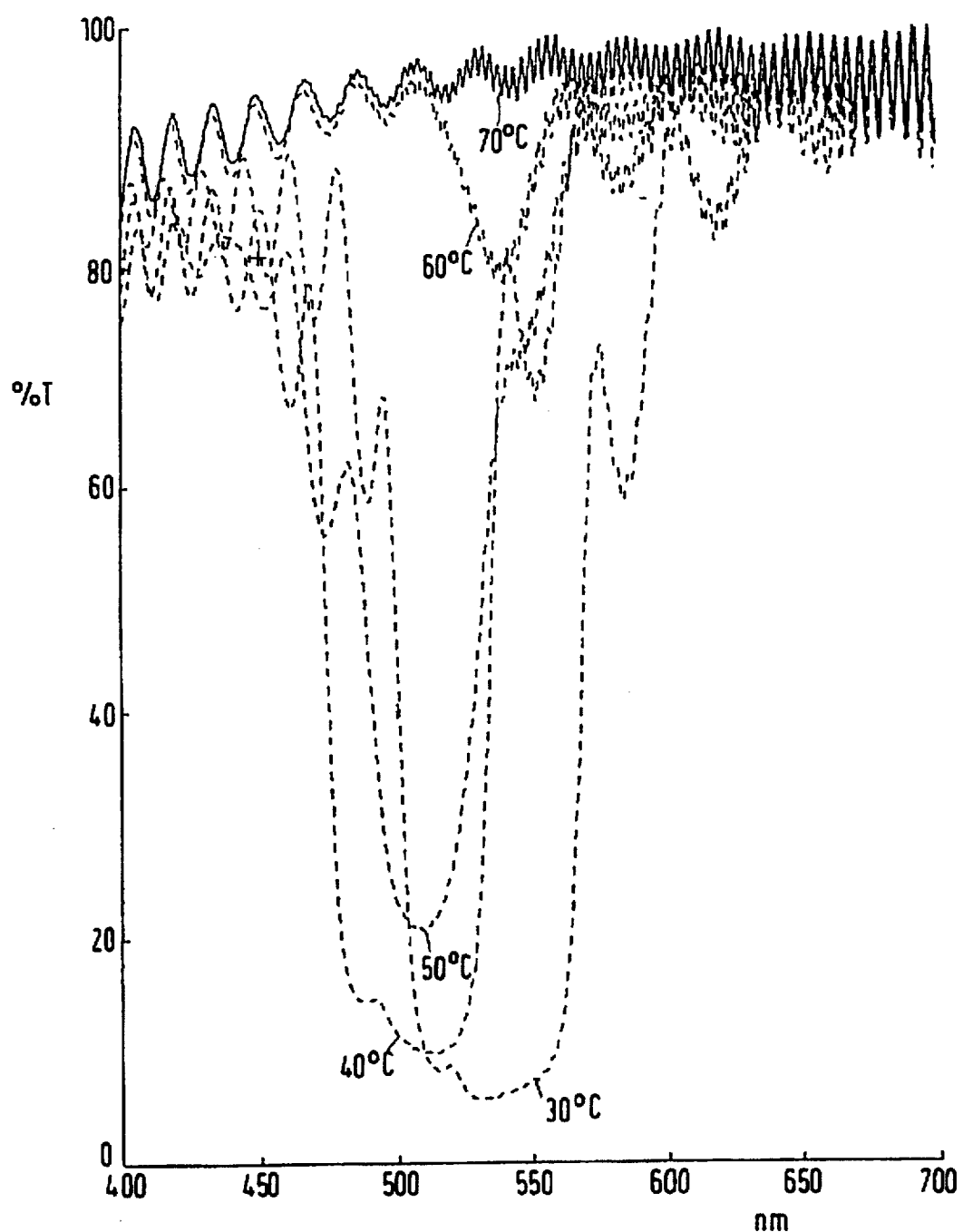
FIG. 9 shows a number of spectra in which the transmission of a fifth embodiment of an inventive filter is shown as a function of temperature.
Figure 10:
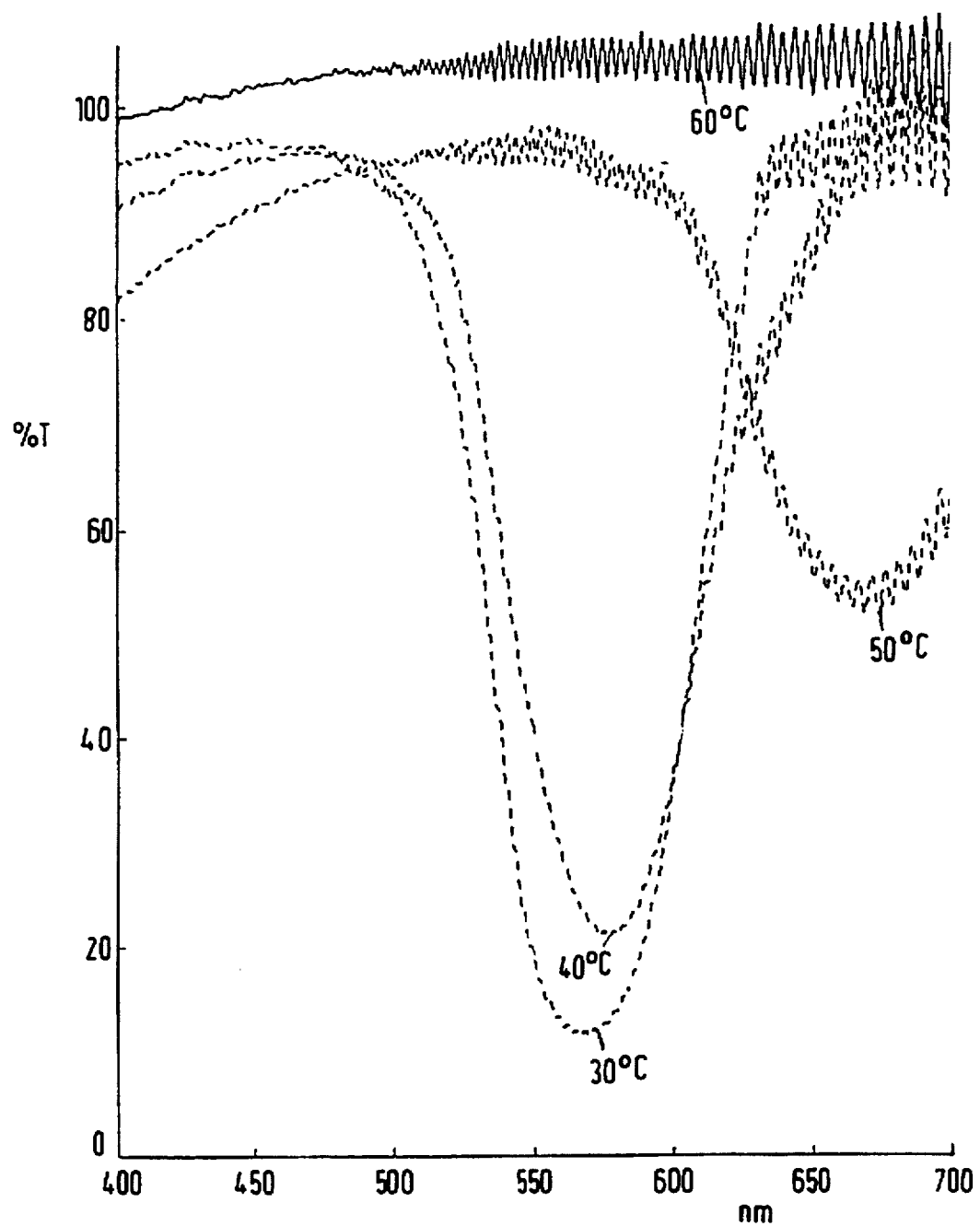
FIG. 10 shows a number of spectra in which the transmission of a filter which is not in accordance with the invention is shown as a function of temperature.

FIGS. 9 and 10 show transmission spectra of, respectively, a fifth embodiment of a switchable cholesteric filter in accordance with the invention and a filter which is not in accordance with the invention. In this case, optically active layers were manufactured from a polymerized mixture of 20 wt. % CB6, 40 wt. % CB15 and 40 wt. % BL006, to which 1 wt. % of Igacure 651 was added. In the embodiment of the inventive filter, 0.8 wt. % of C6M was also added. In the case of the filter which was not in accordance with the invention, no diacrylate compounds were present in the mixture to be polymerized. In both cases the thickness of the optical layer was 2.7 micrometers. The transmission spectra of both filters were measured at different temperatures, i.e. 30°, 40° and 50° C. A comparison between both spectra revealed that the temperature sensitivity of the inventive filter (FIG. 9) was much lower than that of the filter which was not in accordance with the invention (FIG. 10).

Figure 11:
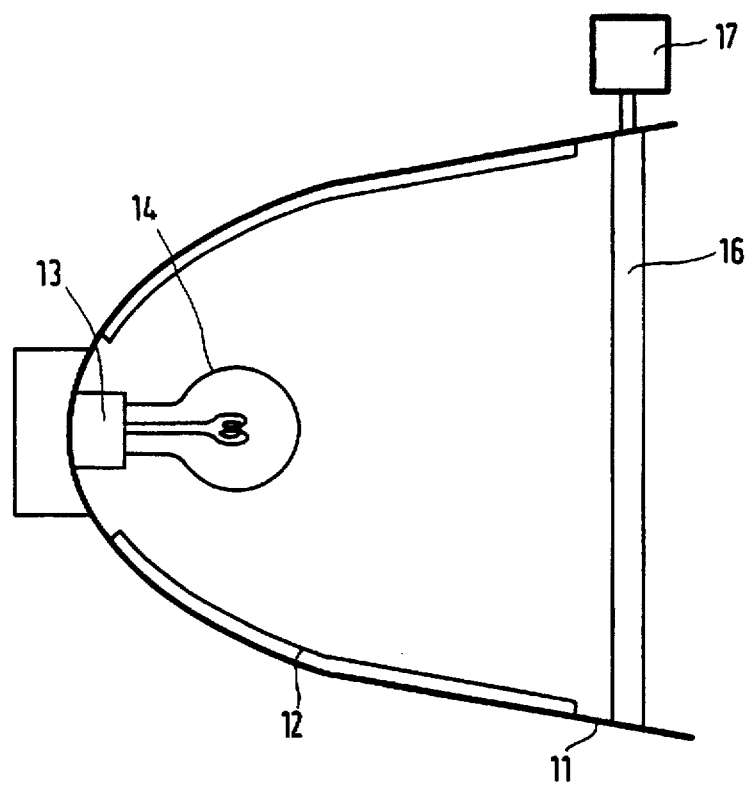
FIG. 11 shows a luminaire in accordance with the invention.

FIG. 11 shows a luminaire in accordance with the invention. The luminaire comprises an envelope 11 which may be provided with a reflector 12. The envelope comprises a connection 13 for a light source 14, which may be provided with electric connection wires (not shown). The luminaire also comprises a switchable cholesteric filter 16 which can be switched by means of an electric device 17. The light generated by the light source 14 is directed to the filter 16, optionally via the reflector 12. The portion of the light corresponding to the helix of the cholesteric layer of the filter is reflected, whereas the rest of the light passes through the filter. The frequency and/or intensity of the reflected light can be changed by varying the voltage across the filter. This causes the characteristic of the transmitted light to be changed.

I claim:

1. A switchable cholesteric filter, which can be switched between a stable colored state and a non-stable transparent state, comprising an optically active layer which is situated between two substrates which are both provided with an electrode layer for applying an electric field, said optically active layer containing a liquid crystalline material which is in the cholesteric phase and which comprises a three-dimensional polymer network which consists of the polymerisation product of maximally 2 wt. % of monomers comprising at least two polymerisable groups and maximally 30 wt. % of liquid crystalline monomers comprising one polymerisable group, the rest of the optically active layer consisting predominantly of a mixture of at least one chiral and achiral liquid crystalline molecules, said network being dissolved in said mixture of liquid crystalline molecules.

2. A switchable cholesteric filter as claimed in claim 1, characterized in that the monomers with at least two polymerizable groups also comprise a liquid-crystalline group.

3. A switchable cholesteric filter as claimed in claim 1, characterized in that (meth)acrylate groups are used as the polymerizable groups of the monomers.

4. In a luminaire comprising a connection for a light source, a cholesteric filter, and means for switching the cholesteric filter, characterized in that said cholesteric filter is a switchable cholesteric filter as claimed in claim 1.

5. A switchable cholesteric filter as claimed in claim 1, characterized in that the optically active layer has a quantity of approximately 0.1–1 wt. % of said monomers with at least two polymerizable groups.

6. A switchable cholesteric filter as claimed in claim 1, characterized in that the optically active layer has a quantity of approximately 15–25 wt. % of said monomers with one polymerizable group.

7. A luminaire as claimed in claim 4, further comprising a light source and reflecting means for reflecting light through the switchable cholesteric filter.

* * * * *